Patented Dec. 29, 1936

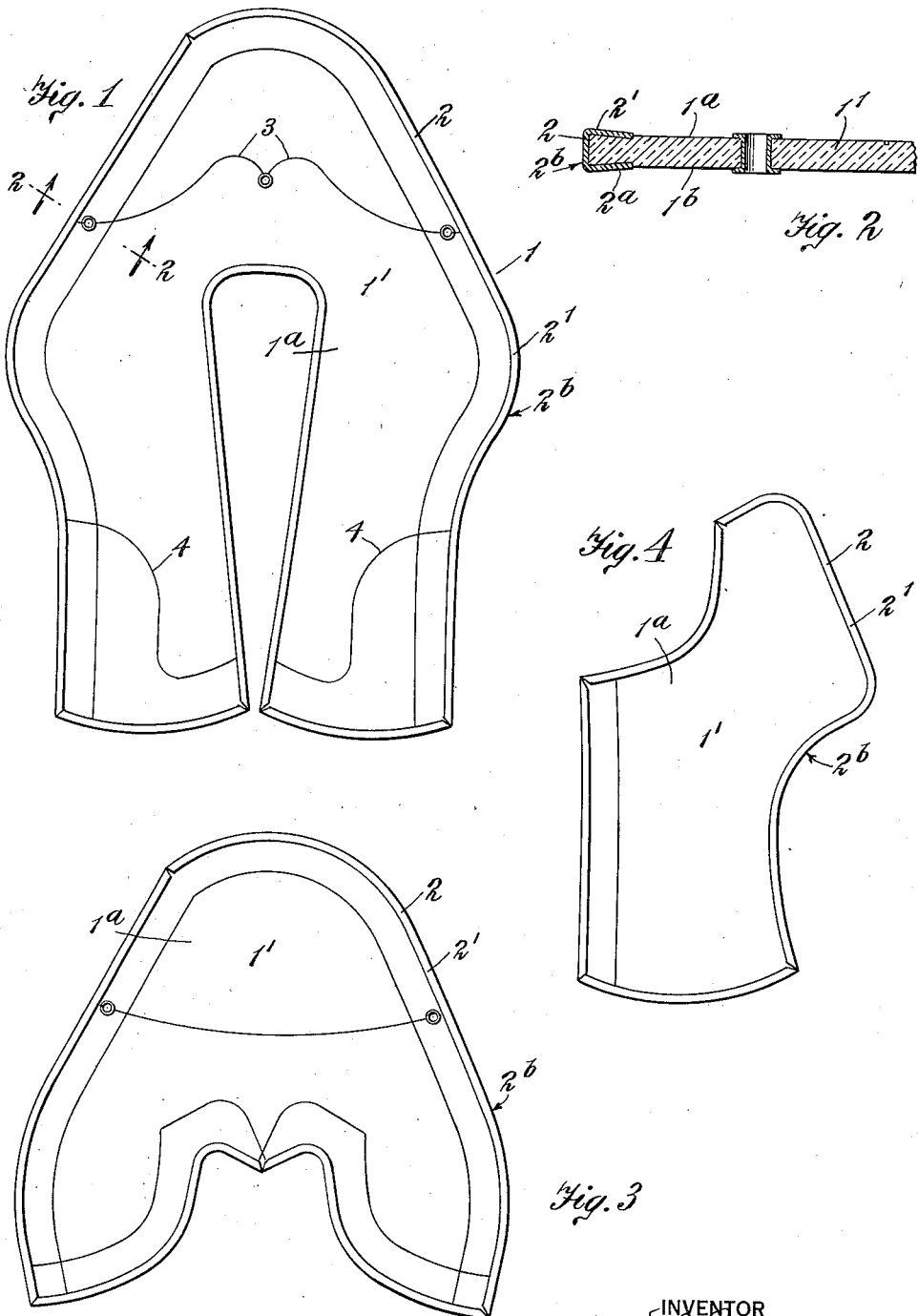

2,065,734

UNITED STATES PATENT OFFICE 2,065,734

PATTERN

Harold L. Pierson, Auburn, N. Y.

Application June 9, 1934, Serial No. 729,744

3 Claims. (Cl. 33—5)

This invention relates to improvements in cutting patterns for skins or other knife-severable material for shoe uppers, shoe tops, gloves, pocket books and the like.

One of the objects of this invention is to provide a transparent pattern comprising a pattern body composed of an elastic, transparent material such as celluloid having a relatively soft molecular structure and cut to the shape of the part desired, and a metallic edging applied to the edge of said body and having a secure clamping connection on the said body. By providing such a body with a metallic binding or edging securely clamped on its outer edge I am enabled to reinforce the body to protect the edge thereof and to provide an accurate guiding edge for guiding a knife in the cutting of the material in accordance with such a pattern.

Another object of my invention is to enable a cutter so to place the pattern in relation to material such as a skin and the imperfections conventionally found therein, that more cuts of shoe uppers or the like may be obtained from the same material.

Another object of my invention is in a transparent pattern to provide in combination with an accurate metallic guiding-edging or binding, indicating lines in properly spaced relationship to the guiding edge of said metallic binding, and adapted to indicate in suitable colors if desired on the transparent body the boundary line between the portions that are exposed and the portions that are concealed in the finished article. By thus indicating on the pattern that portion of an article, such as a shoe upper, which is to be turned in and to extend inwardly of the stitch line or sole line and/or which is to be overlapped by a shoe-tip or the like, a cutter may so place his pattern as to utilize skin portions outside the indicating lines of inferior or mutilated stock, it being understood that the portion of the shoe upper which is to be turned in and to extend inwardly of the stitch line or sole line and/or which is to be overlapped by a shoe-tip or the like, need not be composed of perfect material or stock and that therefore a cutter may so place his pattern as to utilize skin portions outside such indicating lines of inferior or mutilated stock, because said portion outside these indicating lines will in the lasted shoe be covered and concealed.

Another object of my invention is to produce a transparent substantially unbreakable and unmarrable pattern with protected edge which will enable a cutter to see the material, such as leather or skin, that he is cutting beneath the pattern, so as to enable him to position his pattern so as to eliminate in the exposed portion of an article, such as a shoe upper, any defects such as gnat-bite holes, skinning knife cuts, etc.

Another object of my invention is to enable the pattern to be so positioned as to provide and gauge the necessary amount of marginal stock to enable the lasting operators to last the shoe and also to enable the cutter in this marginal stock which is subsequently covered up and partly trimmed off, to utilize the skin portions of an inferior quality of leather than would be desirable to use in the exposed body of the upper.

With these and other objects in view the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:—

Fig. 1 is a view in plan of a transparent celluloid pattern embodying my invention which is adapted to cut a seamless pump;

Fig. 2 is an enlarged fragmentary section on the line 2—2 of Fig. 1 looking in the direction of the arrows;

Fig. 3 is a view in plan of a pattern embodying my invention for an oxford blucher vamp;

Fig. 4 is a view in plan of a pattern embodying my invention for an oxford blucher quarter;

Figure 6:
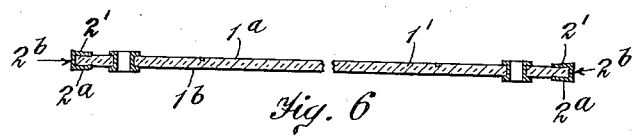
Fig. 6 is a section on the line 6—6 of Fig. 5, looking in the direction of the arrows.

Referring now to these drawings which illustrate a preferred embodiment of my invention, 1 indicates a shoe pattern which in the preferred embodiment of my invention comprises a body 1' having flat upper and lower surfaces $1^a$, $1^b$ and composed of an elastic, transparent and relatively soft material such as transparent celluloid which is capable of being bound at its edge with a metallic binding 2, without crushing such edges. This edging, as shown comprises a metallic U-shaped member adapted to be firmly bound and gripped on the upper and lower surfaces adjacent to the outer edge of the body portion 1'. The outer celluloid edge would, because first, of its relative thinness, and second because of its capability of being cut by a knife be unsuitable to act as a guide for a cutting knife, but such a body has the desirable qualities of being transparent and being soft or elastic enough to permit the edges to be bound with the metallic binding 2, which may be securely clamped thereto by the tightening of the flanges 2'—2ᵃ thereon, as more particularly shown in Figs. 2 and 6. This U-shaped metallic binding 2 is also thicker than said body and is provided with a vertical knife-guiding edge 2ᵇ extending at substantially a right angle to the plane of one of the surfaces of said body so as to enable the guiding thereby of a cutting knife in the operation of cutting a skin or other material as hereinafter described.

In accordance with my invention the transparent bodies 1 are provided, in all of the figures of the drawings, along all or a portion of their marginal edges with an indicating line or lines evenly spaced from and parallel with the outer edge of the binding element on such bodies. These indicating lines define the boundary of the body proper and the marginal lasting area, which lasting area while necessary is, in the lasting operation, completely covered and partially trimmed away. These indicating lines show the position of the stitching line, and when used in combination with a metal-edged transparent pattern are adapted to permit a cutter to shift or place his pattern in relation to the material or skin to be cut in such position that any defects, marks or designs may be positioned beyond the stitch line and also to gauge the amount of lasting stock necessary in a shoe so that a greater number of pieces may be obtained from the same material or skin than would ordinarily be possible.

It will be understood that marginal stock or material may be worked in and utilized in this marginal lasting area even though it embodies marks or scratches, gnat-bites or other defects, and that therefore, a cutter, in the operation of cutting material, such as a skin, may place the transparent pattern in such position that any marks or holes will come within said indicated marginal area and between the metal edge and the indicating lines, and this saving in utilizable material such as skin or leather may be accomplished without in any way detracting from the quality of the finished article.

Indicating lines may also be employed on the transparent body to indicate the seam positions or overlapping parts in vamps over which a tip or toe cap, or adjacent part is to be applied, or these lines may be employed to indicate the positions where any design or applique or ornamentation is located. In Fig. 1 I have shown two such additional indicating lines, the line 3 showing the position of the tip stitching between the vamp throat and a toe cap, and the line 4 showing the overlap of the adjacent quarter or foxing, thus permitting the cutter to select the best material for the relatively small exposed body of the vamp and inferior material for those portions extending beneath the toe cap or tip, and/or for that portion extending beneath the overlapping quarters or foxings and/or for that portion which is covered by any design, applique or ornamentation.

It will be clear that suitable indicating lines may be employed in connection with a transparent body to enable proper positioning of the pattern in relation to the materials to be cut for various other purposes, as for example, the positioning of the transparent pattern in relation to the scales, grain or design of the said material being cut, whereby a shoe or other article may be cut from designed, grained, scaled or like material so as to give the parts of said shoe or other article proper alignment or placing in relation to each other.

Figure 5:
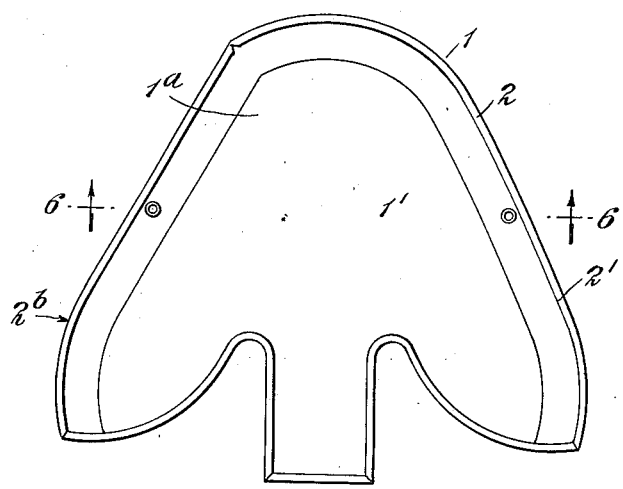
Fig. 5 is a view in plan of another form of pattern.
Figure 7:
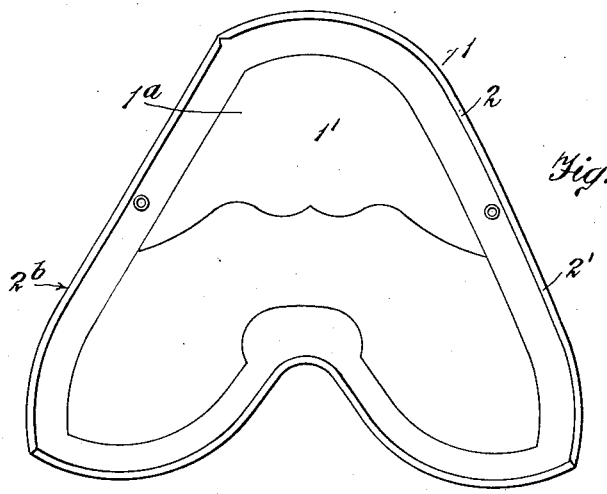
Fig. 7 is a view in plan of another form of pattern with indicating lines differently positioned from those shown in Fig. 3.

In Fig. 1, I have shown my invention applied to a pattern for a seamless pump; in Fig. 3 to a pattern for a blucher oxford vamp; in Fig. 4, to a blucher oxford quarter and in Figs. 5 and 7 to additional forms of shoe vamps.

Having described my invention, I claim:—

1. A cutting pattern embodying a body of non-brittle transparent material having its outer edges cut to the outline of the part of the article it is desired to pattern, said body having indicating lines marked on said transparent material for defining and separating areas to be exposed in the completed article from hidden areas, whereby a user is enabled to gauge and adjust the position of the pattern to the material being cut.

2. A cutting pattern embodying a body of non-brittle transparent material having its outer edges cut to the outline of the part of the article it is desired to pattern, said body having on one of its surfaces between said outer edges indicating lines evenly spaced from and parallel to said outer edges to define the boundary of the body proper and the marginal lasting area, and additional indicating lines extending transversely of the body to indicate the position on said body of edges of parts overlapping said body.

3. A cutting pattern embodying a body of non-brittle and elastic transparent material having its outer edges cut to the outline of the part of the article it is desired to pattern, said body having on one of its surfaces between said outer edges, indicating lines defining and separating areas to be exposed in the completed article from hidden areas and enabling a user to gauge and adjust the position of the pattern to the material being cut, said body also being provided along its said outer edges with a metallic binding element having a knife guiding edge and clinched adjacent to the said edges of the body into the upper and lower surfaces of said transparent material to retain the same in position thereon.

HAROLD L. PIERSON.